R. A. TROUSDALE.
BEAM AND SHANK ATTACHMENT.
APPLICATION FILED SEPT. 12, 1911.
1,041,530.
Patented Oct. 15, 1912.
2 SHEETS—SHEET 1.
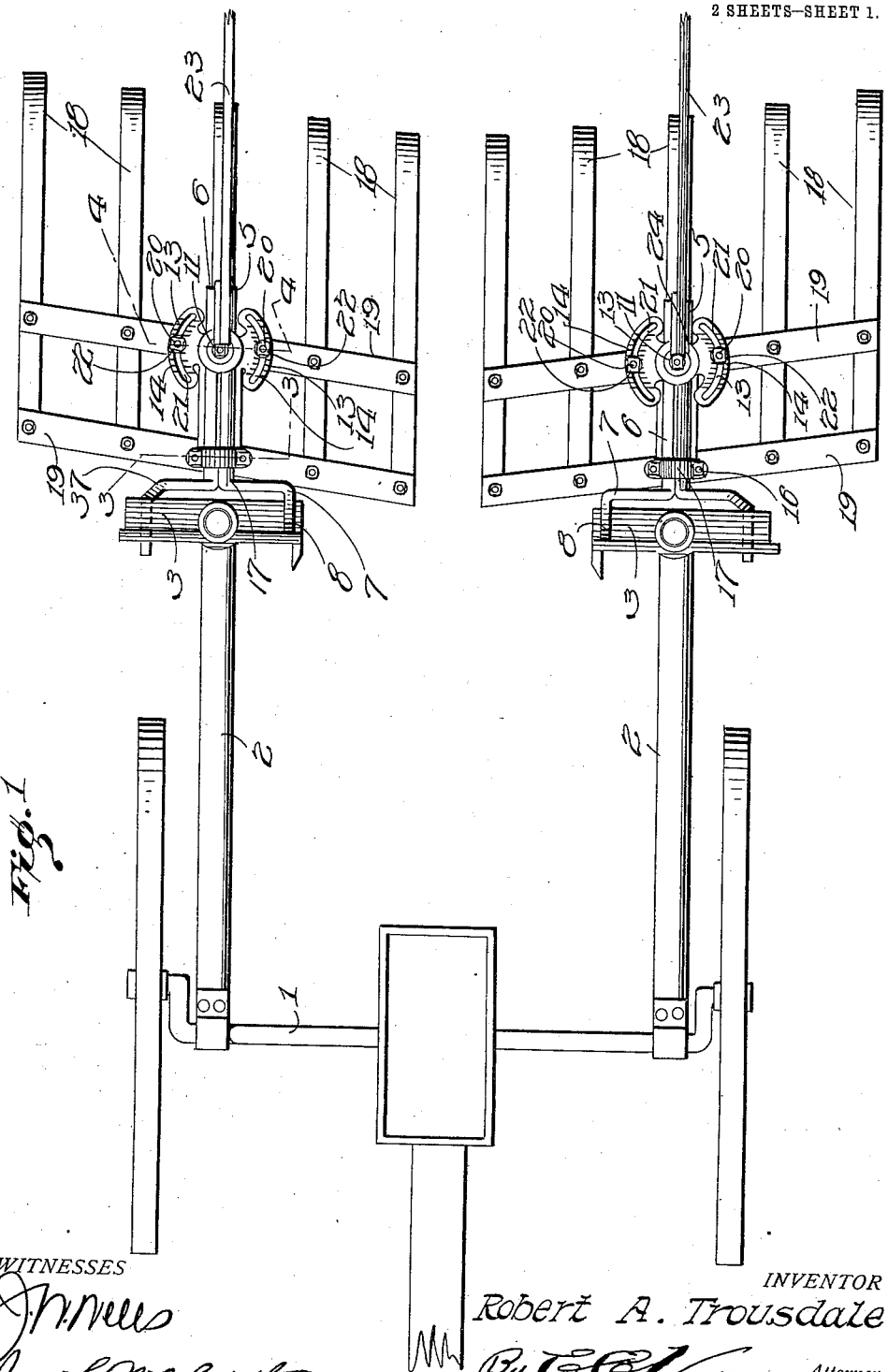
WITNESSES
INVENTOR
Robert A. Trousdale
By C. C. Vrooman, Attorney

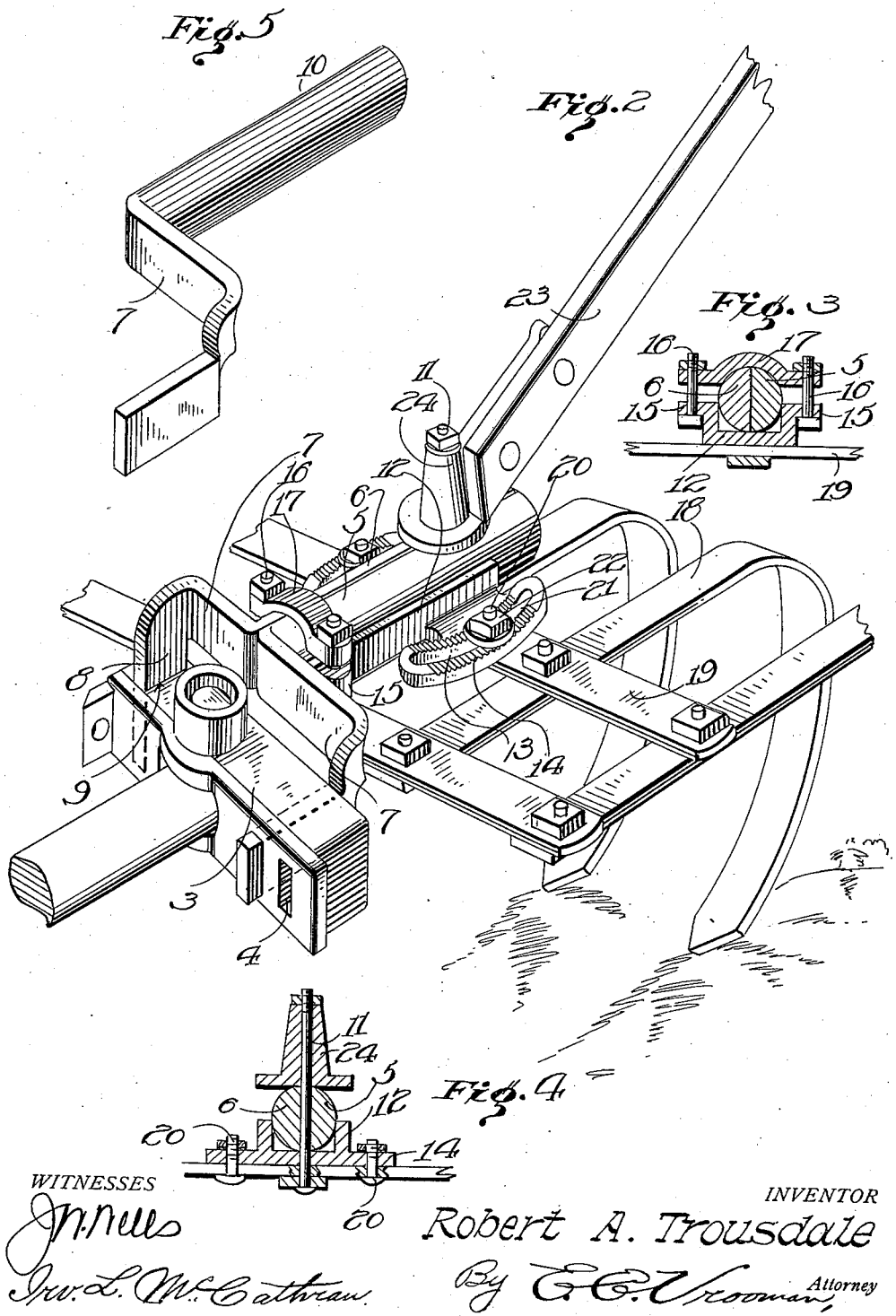

UNITED STATES PATENT OFFICE.

ROBERT A. TROUSDALE, OF TYLER, TEXAS, ASSIGNOR OF ONE-HALF TO J. H. SEETON, OF TYLER, TEXAS.

BEAM AND SHANK ATTACHMENT.

1,041,530.  Specification of Letters Patent.  Patented Oct. 15, 1912.

Application filed September 12, 1911. Serial No. 648,909.

*To all whom it may concern:*

Be it known that I, ROBERT A. TROUSDALE, a citizen of the United States, residing at Tyler, in the county of Smith and State of Texas, have invented certain new and useful Improvements in Beam and Shank Attachments, of which the following is a specification, reference being had therein to the accompanying drawing.

This invention relates to beams and shank attachments for connecting a harrow to the usual plow beam of the ordinary cultivator.

The principal object of this invention is the production of a beam attachment which may be readily attached to the ordinary plow head so as to carry the harrow teeth to the rear of said plow heads.

Another object of this invention is the production of means for facilitating the parallel adjustment of the teeth of the harrow.

With these and other objects in view this invention consists of certain novel constructions, combinations and arrangements of parts as will be hereinafter fully described and claimed.

Figure 1 is a top plan view of the cultivator showing the harrow attached thereto. Fig. 2 is a detail perspective of the means for connecting the harrow to the plow head. Fig. 3 is a section taken on the line 3—3, Fig. 1. Fig. 4 is a section taken on the line 4—4, Fig. 1. Fig. 5 is a detail perspective of one of the beam and shank attachments.

Referring to the drawings by numerals: 1 designates the cultivator to which are attached the usual plow beams 2 carrying at their rear ends the usual plow heads 3. The heads 3 are provided with the usual sockets 4 for receiving the plows and when it is desired to attach the harrow to the plow heads the same may be readily accomplished through the medium of the beam and shank attachments as illustrated more clearly in Fig. 2. The beam and shank attachment consists of a primary section 5 and an auxiliary section 6, each section being provided with an elongated body portion terminating at its front end in the laterally extending portion 7. The outer end of the laterally extending portion 7 of the primary section 5 is bent downwardly and forwardly at right angles to the portion 7 so as to fit into one of the sockets 4 extending transversely of the plow head. The auxiliary section 6, like the primary section, is also provided with the laterally extending portion 7 the end of which is bent downwardly and at right angles to the portion 7. The downwardly extending end 8 of the auxiliary section 6 fits in the vertically extending slot 9 formed in the plow head 3. It will therefore be obvious that, owing to the shaped ends of the primary and auxiliary sections, the same may be readily attached to the plow beam since these ends are so arranged as to fit into the sockets adapted to receive the plows. Each of the primary and auxiliary sections is provided with a portion 10 and these sleeve portions fit upon opposite sides of the semi-cylindrical bolt 11 carried by the channel supporting member 12, as illustrated clearly in Fig. 2. In order to have the sleeve portions to pass upon opposite sides of the bolt 11, the sleeve portions are spaced from each other, at their outer ends. These sleeve portions are, however, clamped together at their inner ends as clearly shown in Fig. 3, by means of the clamp 17. The channel supporting member 12 is provided upon each side with a segmental rack 13 which is provided with teeth 14 upon the upper face thereof. The channel member 12 is also provided near its forward end with a plurality of enlarged portions 15 through which pass the securing bolts 16 for firmly holding the clamp 17 upon the channel member 12 and also holding the primary and auxiliary sections 5 and 6 firmly in connection with the harrow and between members 12 and 17.

The harrow is preferably formed of a plurality of harrow teeth 18 which are connected by transverse strips 19. Bolts 20 pass through the rear transverse strip 19 and through the slot 21 formed in the segmental rack 14. A nut 22 is threaded upon the bolt 20 so as to lock the segmental rack in a set position or at a desired adjusted position.

It will be obvious that by shifting the bolt 20 within the slot 21 the teeth may have parallel adjustment so as to either throw the earth toward the outside of said harrows or between the same.

The usual cultivator handle 23 is connected to the collar 24 so that the harrows may be controlled and the vehicle guided. It will of course be obvious that the ordinary disks may be carried by the beam and shank attachment in place of the spring teeth which are illustrated in the drawings without departing from the spirit of the invention.

Having thus described my invention, what I claim as new, is:—

1. A device of the class described comprising a harrow, means for connecting said harrow to a plow-head, said means comprising a primary and an auxiliary section, one of said sections being provided with a downwardly extending end, and the other of said sections being provided with a forwardly extending end.

2. In a device of the class described, the combination with a harrow, a plow head, said plow head being provided with transverse and vertical sockets, a connecting attachment, said attachment comprising a primary and auxiliary section, said primary section being provided with a laterally extending portion having its outer end bent downwardly and then forwardly and at right angles to said laterally extending portion for fitting in said transverse socket of said head, said auxiliary section being provided with a laterally extending portion having its forward end bent downwardly and at right angles to said laterally extending portion and being adapted to fit in the vertically extending slot formed in said plow head, and means carried by said harrow for holding said primary and auxiliary sections in a locked position upon said harrow.

In testimony whereof I hereunto affix my signature in presence of two witnesses.

ROBERT A. TROUSDALE.

Witnesses:
H. H. HODGES,
W. H. CHITWOOD.

Copies of this patent may be obtained for five cents each, by addressing the "Commissioner of Patents, Washington, D. C."